DATA PROCESSOR

Filed July 12, 1963 3 Sheets-Sheet 1

INVENTORS
ALFRED A. BINDER &
THOMAS J. LINDER
BY Hurvitz & Rose
ATTORNEYS

Sept. 20, 1966 A. A. BINDER ET AL 3,274,564

DATA PROCESSOR

Filed July 12, 1963 3 Sheets-Sheet 2

INVENTORS
ALFRED A. BINDER &
THOMAS J. LINDER

BY Hurvitz & Rose

ATTORNEYS

Sept. 20, 1966 A. A. BINDER ET AL 3,274,564

DATA PROCESSOR

Filed July 12, 1963 3 Sheets-Sheet 3

INVENTORS
ALFRED A. BINDER &
THOMAS J. LINDER

BY Hurvitz & Rose

ATTORNEYS

United States Patent Office 3,274,564

Patented Sept. 20, 1966

3,274,564
DATA PROCESSOR

Alfred A. Binder, Cincinnati, Ohio, and Thomas J. Linder, Eau Gallie, Fla., assignors to Avco Corporation, Cincinnati, Ohio, a corporation of Delaware Filed July 12, 1963, Ser. No. 294,589
11 Claims. (Cl. 340—172.5)

The present invention relates generally to data processing equipment and more particularly to such equipment wherein a complete data message is retrieved without information being lost when an operating malfunction in an output device occurs.

In real time data processing equipment, of the type employed in automatic factory facilities, computed and/or stored data are supplied from a main data processor through a buffer storage to an output device, such as a printer, typewriter or punch. With existing systems, a malfunction of the output device in the process of receiving data frequently results in considerable loss of information. The information loss occurs because data are read from the buffer memory, are never recorded, and are not retrieved. Even if non-destructive buffer memories are utilized, the data address in the memory is lost to preclude information retrieval without considerable difficulty.

In the present invention, these problems are avoided by sensing the operating condition of the output device. When a non-operating or malfunction condition thereof is sensed, an address counter that controls character read out from the buffer memory into the output device is reset to the first character in the message. During normal operation, the address counter is advanced in response to each character being recorded by the output device, whereby a different buffer memory character is sequentially outputted. When the address counter is reset to zero, prior to message completion and in response to a malfunction of the output device, the buffer memory contents are frozen. The memory cannot be erased until the equipment is again operating and the entire message in the buffer memory has been subsequently correctly outputted.

A malfunction to an output device printing a label on which appear, for example, customer name, address, order type and quantity, would cause that label to be rendered useless. With the present invention, a new address label may be correctly positioned in the output device after its operation has been resumed so that the label in the printer when the error occurred need not be utilized. This is advantageous because no confusion arises with regard to wrong, missing or typed over characters on the first label.

As a precautionary measure to prevent outputting erroneous data, a parity check on each character is performed. If a parity error is detected, an alarm is activated, the erroneous character is not applied to the output device, and the buffer memory as well as the character counter are frozen. This enables a check to be performed on the data to determine the error source without loss of information.

An additional feature of the invention resides in preventing information flow to the output device when that device does not record a character at a time it is expected to do so. Upon such an occurrence, an alarm is activated and the character counter as well as the buffer memory are frozen. Thereby, after the system has been corrected the missed character is read from the buffer into the output device without any information being lost.

In accordance with another aspect of the invention, only upon completion of the message is information erased from the buffer memory by new information being supplied thereto. The occurrence of a malfunction in the output equipment therefore does not cause information to be lost, whereby complete retrieval may be accomplished.

It is, accordingly, an object of the present invention to provide new and improved data processing equipment wherein data is always retrieved when an equipment and/or signal content error occurs.

It is another object of the invention to provide data processing equipment wherein a complete message is retrieved after a malfunction in peripheral output equipment (e.g. a printer, punch, or typewriter) is repaired, no matter how much of that message may have been originally supplied to the peripheral equipment prior to the malfunction.

A further object of the invention is to provide data processing equipment wherein data are not lost because an output device failed to record a character.

An additional object of the invention is to provide a data processor wherein the contents of an output, buffer memory are: (1) frozen upon the occurrence of a non-operating condition existing in a read-out equipment (e.g. a printer, punch or typewriter); and (2) are not erased until the readout equipment is again operating and the message in the buffer memory has been completely fed to the readout device.

Still another object of the invention is to provide a data processor in combination with an output equipment wherein data outputting is terminated without information being lost upon the occurrence of: (1) a malfunction in the output device caused by a power failure thereto or failure to print a character; or (2) erroneous information being outputted, as determined by a parity check.

The above and still further objects, features and advantages of the present invention will become apparent upon consideration of the following detailed description of one specific embodiment thereof, especially when taken in conjunction with the accompanying drawings, wherein.

Figure 1:
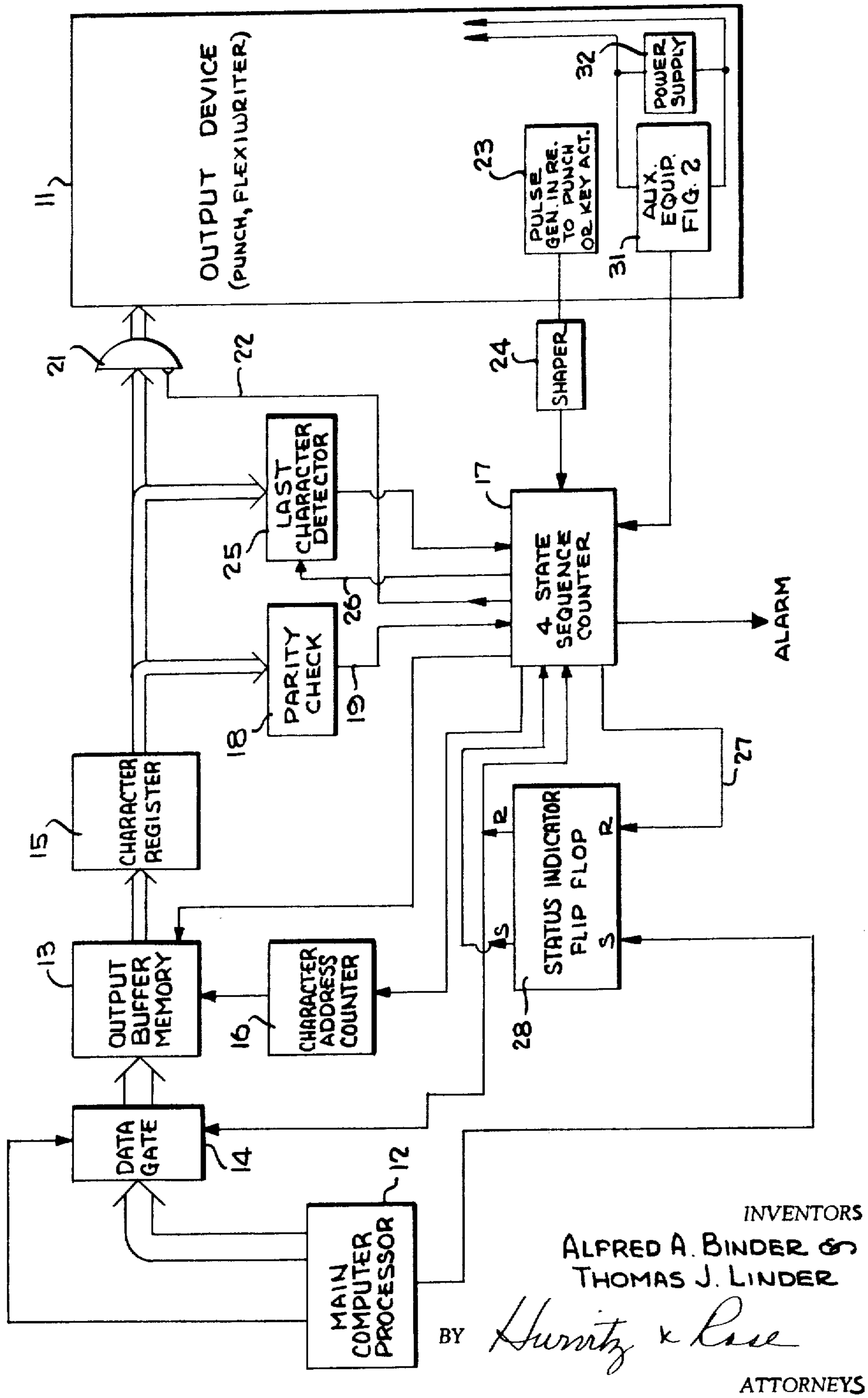
FIGURE 1 is a block diagram of a preferred embodiment of the present invention.

Reference is now made to FIGURE 1 wherein data to be supplied to output device 11 (e.g. a punch or Flexowriter) from main computer processor 12, having the usual drum memory, arithmetic and data processing units, are coupled to buffer memory 13 that is responsive to a control signal applied from the main processor to data gate 14. Data are in the form of seven parallel, simultaneously occurring bits that make up a character. Twelve sequential characters comprise a word, ten of which in sequence make up a group. When a predetermined number of groups has passed through gate 14, to form a message, the gate is closed in response to the control signal applied thereto from main processor 12.

Each character is stored in buffer memory 13 at a different address, with descending addresses being sequentially arranged in accordance with the time position at which the characters were fed to the memory. Hence, the first character in each message is stored at the address designated as character twelve, word ten, group six while the second character is located at character eleven, word ten, group six. Each character is thus sequentially stored in a separate memory location until the last character in a message is reached and approximately stored, e.g. the last character of one particular message may be stored at address: character eight, word seven, group one. Memory 13 is of the non-destructive readout type wherein information is stored in each address until a new data message is supplied thereto through gate 14. The memory may be a random access core matrix or a segment on the main drum memory of processor 12.

Every character stored in an instruction to output device 11; e.g. a letter, number, punctuation mark, space; except the last which is coded in a predetermined manner to indicate last character in a message. The seven parallel bits in each character include six data bits and an error checking parity bit, having a binary value such that there is an odd number of binary zeros in every character.

In main processor 12 and the apparatus shown in FIGURE 1, each operation occurs under the control of a clock pulse source, now shown. The clock source generates a pair of separate pulse trains, denominated A and B, which trains are of the same frequency but have their pulses displaced by 180°, i.e. a pulse occurs in one train exactly between adjacent pulses in the other train. Unless otherwise indicated, each operation in the apparatus described occurs in response only to pulses in wave train A. Since the use of such timing wave trains is conventional in the computer art, no illustration of the leads carrying them is made.

Each address in buffer memory 13 is sequentially read out to seven bit character register 15 in response to control signals supplied to the memory from character address counter 16 and sequence counter 17, having four stages denominated zero, one, two and three.

As described infra, the preceding operation occurs with counter 17 in stage one, at which time the seven parallel bits in each character are non-destructively stored in register 15 until the next character is read out of memory 13. The signal stored in register 15 is applied to parity check circuit 18 in response to the B timing pulse immediately after the A pulse that caused the register to be loaded. In response to a correct parity indication deriving from circuit 18, a signal is produced on lead 19 to advance sequence counter 17 from state one to state two.

The contents of register 15 are now applied in parallel to output device 11 through gate 21, opened in response to the signal on lead 22 that indicates counter 17 is in state two. In response to the six data bits simultaneously coupled to it, device 11 outputs the character by, e.g., punching a series of holes in a paper tape or activating a Flexowriter key. As each character is recorded by device 11, a pulse is derived from generator 23 that is commercially available with peripheral equipment generally used for the output device. The signal from generator 23 is appropriately modified in shaper 24 so a pulse is supplied to counter 17 in response to the A timing pulse immediately following the A timing pulse that controlled data flow from register 15 to output device 11.

The input to counter 17 from shaper 24 advances the counter to state three wherein address counter 16 is decremented to advance memory 13 to its next address. In response to the B clock pulse that occurs immediately following counter 16 being decremented, the contents of register 15 are supplied to last character detector 25 under the influence of the signal on lead 26 that indicates counter 17 is in state three. Detector 25 then analyzes the bits stored in register 15. If the last character bit is not stored in register 15, as is the usual case, counter 17 is advanced directly to state one in response to the output of detector 25. As counter 17 advances from state three to state one, the next address in memory 13 is read out into register 15 and the sequence is repeated over and over again until the last character is supplied to register 15.

When the predetermined code for the last character is sensed by detector 25, the detector derives an output signal to advance counter 17 from state three to state zero. With counter 17 so returned to the zero state, a signal is generated on lead 27 to reset status indicator flip flop 28, previously activated to its set condition by a signal from processor 12, as seen infra.

Resetting flip flop 28 enables gate 14 to be opened in response to a command signal from main data processor 12. When the signal occurs, a message block is sequentially, character by character, loaded into memory 13. When the message block is completely loaded into memory 13, gate 14 is closed in response to termination of the control signal from processor 12. As the control signal ends, a pulse from processor 12 activates flip flop 28 into the set status. Setting flip flop 28 enables counter 17 to be stepped from state zero to state one if the signal deriving from auxiliary equipment 31 indicates output device 11 is properly activated. Equipment 31 monitors internal D.C. power supply 32 of device 11 so that the equipment output signal does not allow counter 17 to be advanced to state one if a power supply fuse is blown or if the power cord for device 11 is not properly connected.

Counter 17 is arranged so that it is immediately returned to state zero, no matter what its previous state, upon the occurrence of a non-operating indication of device 11, as determined by auxiliary equipment 31. Since returning counter 17 to state zero results in resetting counter 16 to the initial message character, a non-operating condition of output device 11 causes memory 13 to be addressed to the first character of the previous message. Thus, when device 11 is again correctly operating the entire previous message in memory 13 is retransmitted to output device 11. Storing a new message in memory 13 is precluded since gate 14 can only be opened in response to resetting of flip flop 28, an operation performed only in response to detection of the last character in a message.

If an operation that is expected in any state of sequencer 17 does not occur (i.e. if a non-opertaing signal is derived from equipment 31 when counter 17 is in state zero; there is a parity error when counter 17 is in state one; or if there is a no printing signal from generator 23 with counter 17 in state two) the state of counter 17 is frozen and an alarm is activated thereby. Freezing the state of counter 17 prevents further flow of information to output device 11, thereby enabling the source of error to be rectified while preventing a loss in data.

Figure 2:
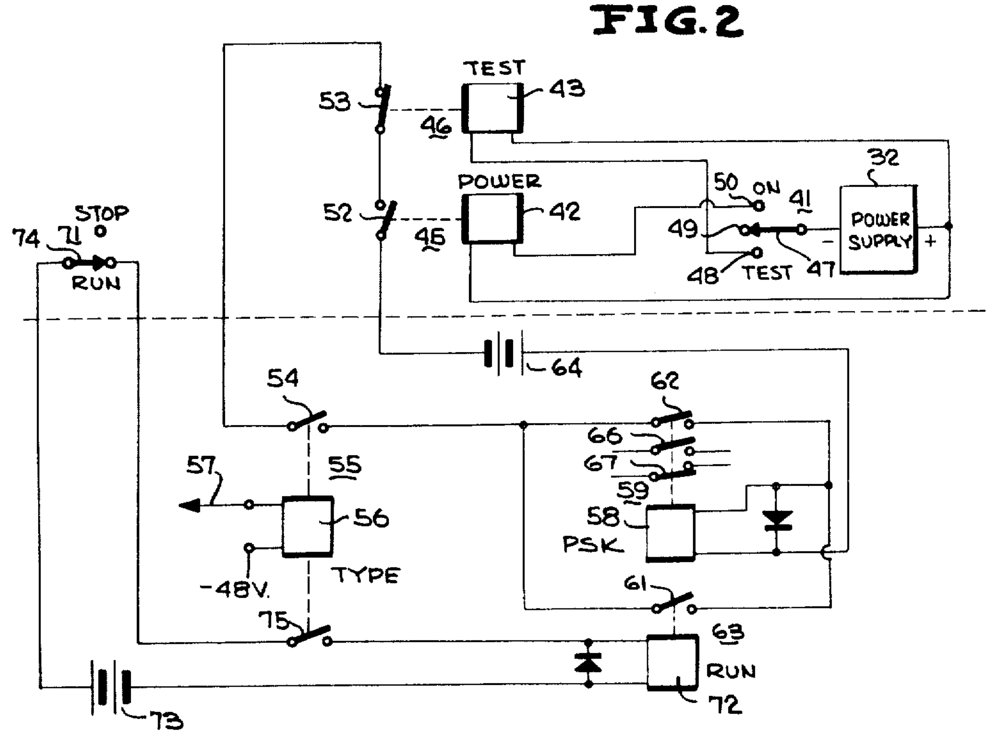
FIGURE 2 is a circuit diagram of relay control equipment utilized in FIGURE 1.

The circuitry comprising equipment 31 is illustrated in FIGURE 2. Power supply 32 for output device 11 is selectively connected through triple pole, single throw switch 41 to coils 42 and 43 of relays 45 and 46, having normally open and closed contacts 52 and 53, respectively. Switch 41, generally included on device 11 as delivered, is designed so its armature 47 engages contacts 48, 49 and 50 when the device is tested, off, and operated, respectively. It frequently occurs, however, that the switch is not correctly positioned so the output mechanism connected between the positive terminal of supply 32 and contact 50 does not receive power, an intolerable situation for on-line, real time equipment.

Contacts 52 and 53 are series connected with normally open contacts 54 of "type" relay 55, the coil 56 of which is energized by the voltage on lead 57 when status flip flop 28 (FIGURE 1) is activated to its set position. Connected in parallel between contact 54 and coil 58 of PSK (Print/Punch Selection Check) relay 59 are normally open contacts 61 and 62 of "run" relay 63 and the PSK relay, respectively. The other side of coil 58 is connected to the positive terminal of D.C. supply 64, the negative terminal of which is connected to contact 52, whereby coil 58 is energized by source 64 with contacts 52, 53, 54 all closed and either of contacts 61 or 62 closed. Contact 62 is in a holding circuit for coil 58 once current flows to the coil via the contact 61. With coil 58 energized, its normally open and closed contacts 66 and 67, the function of which is described in connection with FIGURE 3, are switched from the opposite position illustrated.

To energize PSK relay 58 only when "stop-run" switch 71, on output device 11, is activated to its run position, coil 72 of relay 63 is selectively connected in series circuit with D.C. supply 73 via contact 74 and normally open contact 75 of "type" relay 53. The purpose of switch 71 is to enable output device 11 to be shut off when a message has been completed, as is necessary if it is required to replace the device with another device or to replenish the paper supply of device 11 outputting characters.

In operation, PSK relay 59 is energized initially only when armature 47 engages "on" contact 50, switch 71 is in the "run" state, and status indicating flip flop 28 is in the set state to activate relay 55. Under such conditions, coils 42 and 43 are respectively energized and de-energized to close contacts 52 and 53, whereby a series circuit is formed from the negative pole of supply 64 to contact 54. Contacts 54 and 75 are closed by virtue of coil 56 being activated in response to the voltage on lead 57 from flip flop 28. In consequence, a series circuit is established through contacts 74 and 75 from supply 73 to coil 72, so contact 61 is closed.

Figure 3:
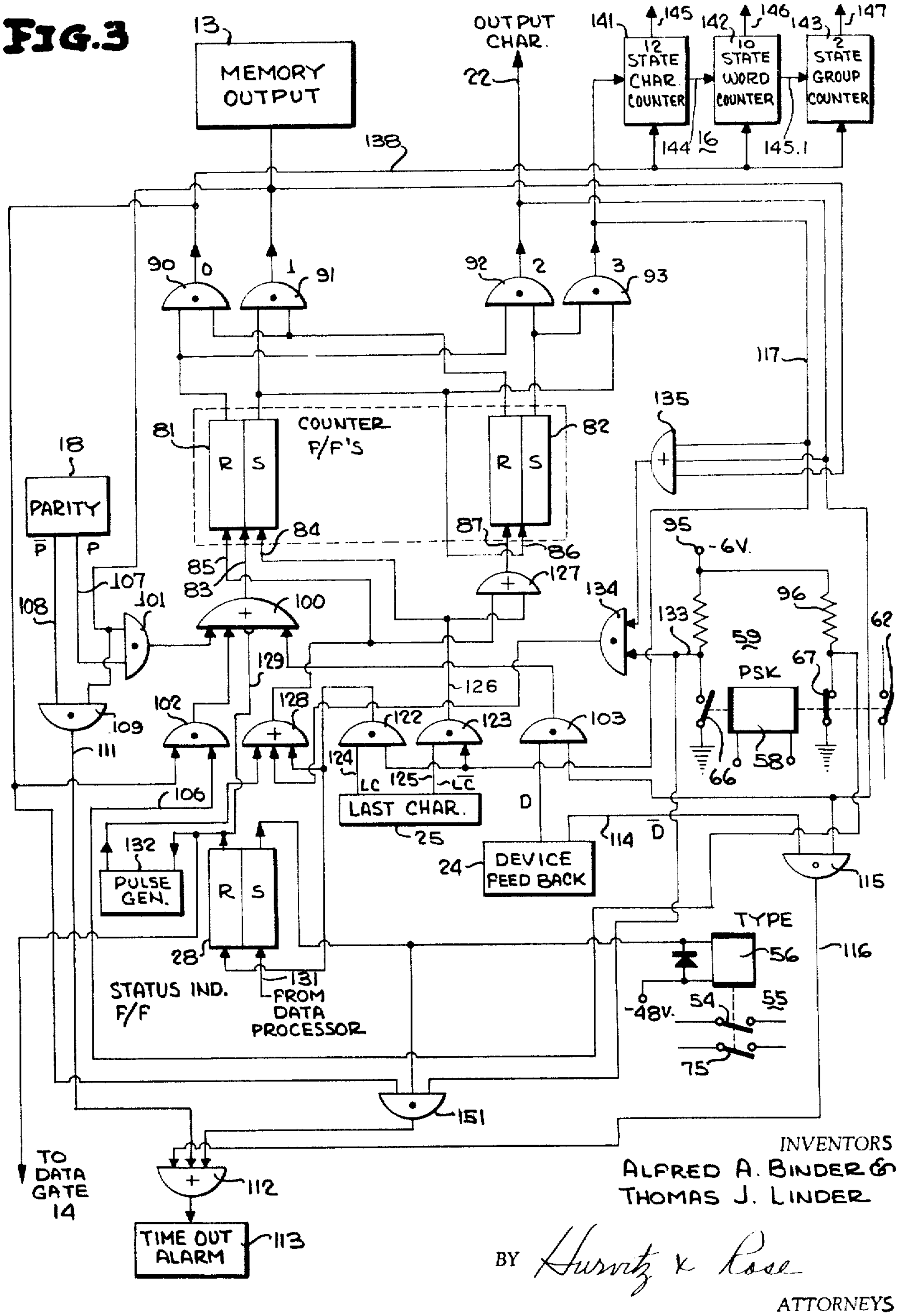
FIGURE 3 is a circuit diagram of the sequence counter of FIGURE 1 with its peripheral control elements.

Coil 58 is thereby supplied with power from supply 64 via contacts 52, 53, 54 and 61 to close contacts 62 and 66 and open contact 67, the latter two contacts being connected with the sequence counter, as described in regard to FIGURE 3. Closure of contact 62 establishes a holding latching circuit for relay 59 so that deactivation of relay 63 in response to switch 71 being positioned off of the "run" terminal has no effect on relay 59.

In response, however, to status indicating flip flop 28 being reset at the end of a message being supplied to peripheral equipment 11, whereby relay 55 is deactivated, contacts 54 and 75 open to break the current path between supply 64 and relay 59. PSK relay 59 is also deenergized if a failure to power supply 32 should occur while information is being read to output device 11. Such a failure may occur in response to a fuse blowing in the power supply circuit, disconnecting the power cord, or positioning armature 47 off of contact 50 onto contact 48 or 49.

Removal of power from terminal 50 deactivates relay 45 to open contact 52 and break the energizing circuit for coil 58. As a fail safe measure, contact 53 is opened in response to armature 47 being positioned on terminal 48 as a result of coil 43 being energized by supply 32.

With PSK relay 59 deenergized in response to any of contacts 52, 53, or 54 being open, sequence counter 17 is returned to its zero state. With counter 17 so activated, character address counter 16 is returned to its initial count. When PSK relay 59 is again activated upon resumption of normal operation, the first character of the message subsisting in memory 13 when the malfunction occurred is supplied to recording device 11. If device 11 addresses labels, for instance (one message for each label), this operation enables a new label to be printed upon without having to re-route, through main processor 12, the message being read out at the time of failure. As a further and more important feature, the described operation prevents loss of a considerable part of the data associated with the message.

Reference is now made to FIGURE 3 of the drawings wherein sequence counter 17, its control and output circuits are illustrated. Counter 17 includes two bistable flip flops 81 and 82 arranged as a four state counter. Each flip flop includes an input lead common to both of its stages whereby a pulse changes the flip flop state, as well as leads that carry pulses to set the flip flop invariably to only one state. Thus, a pulse on center lead 83 changes flip flop 81 from a set to re-set state and vice-versa while pulses on leads 84 and 85 respectively set and reset the flip flop. Similarly, a pulse on center lead 86 either sets or reset flip flop 82 and a pulse on lead 87 only resets the flip flop.

The set and reset outputs of flip flops 81 and 82 are connected with AND gates 90–93 so that the signals deriving from the gates are respectively indicative of the zero, one, two and three states of the counter.

To properly shift flip flop 82 in response to every other pulse on lead 83 and/or upon flip flop 81 being driven from set to reset by an A clock pulse, the set output of flip flop 81 is connected to the common input of flip flop 82 on lead 86. Hence, flip flops 81 and 82 with gates 90–93 are arranged to provide counter outputs in accordance with the flip flop states as indicated in Table 1:

TABLE 1

| Flip Flop State | F/F 81 | F/F 82 |
|---|---|---|
| Counter State: | | |
| 0 | Reset | Reset. |
| 1 | Set | Do. |
| 2 | Reset | Set. |
| 3 | Set | Do. |

Under sequential operation, flip flops 81 and 82 are stepped through states 0–3 in response to pulses coupled to lead 83 from OR gate 100 that passes pulses deriving from any one of AND gates 101–103. AND gates 101–103 are responsive to "counter state indicating" AND gates 90–93 and various control signals described in regard to FIGURE 1.

With counter 17 in state zero, whereby the reset outputs of flip flops 81 and 82 are activated so that a binary one is generated by AND gate 90, AND gate 102 is enabled to pass an indication on lead 106 regarding the status of PSK relay 59. The indication is derived in response to contact 67 selectively providing a low impedance path to ground for the −6 volt supply connected to terminal 95 and current limiting resistor 96. Deactivation of relay 59 results in ground potential being supplied to AND gate 102 so no output is derived from it. When relay 59 is activated AND gate 102 is enabled, whereby an output is generated by the gate. The output of AND gate 102 is coupled through OR gate 100 to advance flip flops 81 and 82 to state one.

In state one, the set and reset outputs of flip flops 81 and 82, respectively, are combined by AND gate 91 which derives a binary one signal that passes through AND gate 101, provided circuit 18 indicates a proper parity check for the character in register 15, as determined by the voltage on lead 107.

If a parity error is detected whereby no signal is on lead 107, gate 101 does not generate an output pulse and counter 17 remains in state one. To provide a parity error indication, the complementary output lead 108 of checking circuit 18 is combined with the state one output deriving from gate 91 in AND gate 109. When binary one signals are on both inputs to gate 109, the signal generated on lead 111 is coupled through OR gate 112 to activate "time out" alarm 113. Alarm 113 provides a visual and/or aural indication of a malfunction to the system operator. The cause of malfunction can be determined by monitoring the voltage on lead 111.

Returning to the sequential operation of counter 17, a pulse on lead 83 causes the counter to be driven to state two whereby flip flops 81 and 82 are reset and set, respectively. With flip flops 81 and 82 so activated, a binary one output is derived from AND gate 92. The binary one signal generated by gate 92 is combined in AND gate 103 with the signal produced by pulse shaper 24. The signal deriving from shaper 24 has a binary one value when generator 23 produces a signal to indicate character recordation by device 11. If the printer or punch of device 11 were not activated, the complementary output 114 of shaper 24 is activated and combined in AND gate 115 with the output of AND gate 92. With AND gate 115 supplied with binary ones on both of its leads, a signal is generated on lead 116 to activate alarm 113 via OR gate 112. This causes counter 17 to be frozen in state two because no signal is available at the input of gate 100 to advance the counter to state three.

But with counter 17 advanced to state three in response to a pulse from AND gate 103, flip flops 81 and 82 are both activated to a set condition so a binary one is generated by AND gate 93 on lead 117. The signal on lead 117 is applied in parallel to AND gates 122 and 123, respectively responsive to the last character indicating signal deriving from circuit 25 on lead 124 and its complement on lead 125. Thereby, binary ones are generated by gates 122 and 123 when counter 17 is in state three to provide indications of whether or not the character just previously supplied to device 11 was the last character in a message.

If the character just previously supplied to device 11 was not the last character, AND gate 123 establishes a binary one on lead 126, which binary one is supplied to the set and reset sides of flip flops 81 and 82, respectively, via leads 84 and 87, the latter coupling being through OR gate 127. This results in counter 17 being activated into state one, by-passing state zero. When lead 124 is energized with a last character indication, while counter 17 is in state three, AND gate 122 generates a signal to activate flip flop 28 into its reset status, whereby further outputting of characters to device 11 is prevented and gate 14 is enabled to be opened so new data can be entered into memory 13. The output signal of AND gate 122 is also supplied through OR gate 128 in parallel to lead 85, and OR gate 127. Thereby, flip flops 81 and 82 are both activated to their set states, indicative of counter 17 being in state zero. The counter remains in state zero until gate 100 is enabled in response to the inhibit signal on lead 129 from the reset side of flip flop 28 being removed.

Flip flop 28 is activated back to its set state in response to a signal on lead 131 from data processor 12, which signal indicates that a message has been loaded into buffer memory 13. With flip flop 28 set, gate 14 is closed to preclude: (1) further entering of data into memory 13; and (2) erasing of the contents already stored in the memory, no matter what signal is received from data processor 12. As flip flop 28 switches from the reset to the set state, a pulse is derived from generator 132. This pulse is coupled through OR gate 128 to activate flip flops 81 and 82 into the zero state of counter 17, thereby insuring the same starting point in each cycle since counter 16 is reset to its first address by the output of zero state indicating gate 90.

Counter 17 is also returned to its zero state by de-energization of PSK relay 59. When coil 58 of the relay is supplied with current, indicative of proper operation of output device 11, contact 66 is closed so ground potential is on lead 133. The ground potential on lead 133 prevents AND gate 134 from passing the output of OR gate 135 to OR gate 128 and enables counter 17 to step through its sequential operation. If a malfunction in equipment 11 should occur so relay 59 is deactivated, contact 66 opens and a minus six volt potential appears on lead 133. If counter 17 is in any of states one, two or three, as determined by the outputs of AND gates 91–93 being combined in OR gate 135, the negative voltage on lead 133 is passed through AND gate 134 to return counter 17 to state zero. Returning counter 17 to state zero by this operation does not effect the status of flip flop 28, so the flip flop 28 remains set to prevent both a new message from being supplied through gate 14 and erasing information stored in memory 13.

When counter 17 is activated to its zero state, a voltage is supplied from gate 90 via lead 138 to the reset terminals of counters 141–143 in address counter 16. Counters 141–143 are of twelve, ten and two states, respectively, to provide control signals for each address location in buffer memory 13. The separate counters are arranged so that initially they are set to address: character 12; word 10; group 6; in response to a signal on lead 138. In response to each binary one output of AND gate 93, counter 141 is decremented one step. After twelve pulses from gate 93, counter 141 returns to its initial state, character 12, and at the same time supplies a pulse to counter 142 on lead 144. The pulse on lead 144 reduces the count stored in counter 142 from ten to nine so counter 16 stores the address: character 12; word 9; group 6. Word counter 142 stays in state 9 until counter 141 is again stepped from character 1 to character 12, at which time the word counter is reduced to state 8. After ten pulses have been fed to counter 142 on lead 144 whereby the counter is switched from state 1 back to state 10, a pulse is generated on lead 145.1 to activate group counter 143 from state six to state five. In a similar manner, every tenth input to counter 142 causes a pulse to be generated on lead 145.1 to reduce the state of counter 143 by one increment.

Thus, character, word and group counters 141–143 are stepped through a sequence that may consist of 240 characters. Generally each message is considerably shorter than 240 characters so counters 141–143 are reset to zero by the voltage on lead 138 before the highest possible count is reached.

Counters 141, 142 and 143 include twelve, ten, and two output leads, respectively, as designated by numerals 145, 146 and 147. As each counter stage is activated, a voltage is generated on a different one of these leads. The voltages are supplied to memory 13 for selecting the next address to be read out.

To provide indications that output device 11 is not properly operating, as determined by the status of PSK relay 59, the ungrounded side of contact 66 is connected to the input of AND gate 151. Gate 151 is also responsive to the set output of flip flop 28 and "zero counter state indicating" AND gate 90 so the signal derived thereby is a binary zero unless all of its inputs are binary ones.

Figure 4:
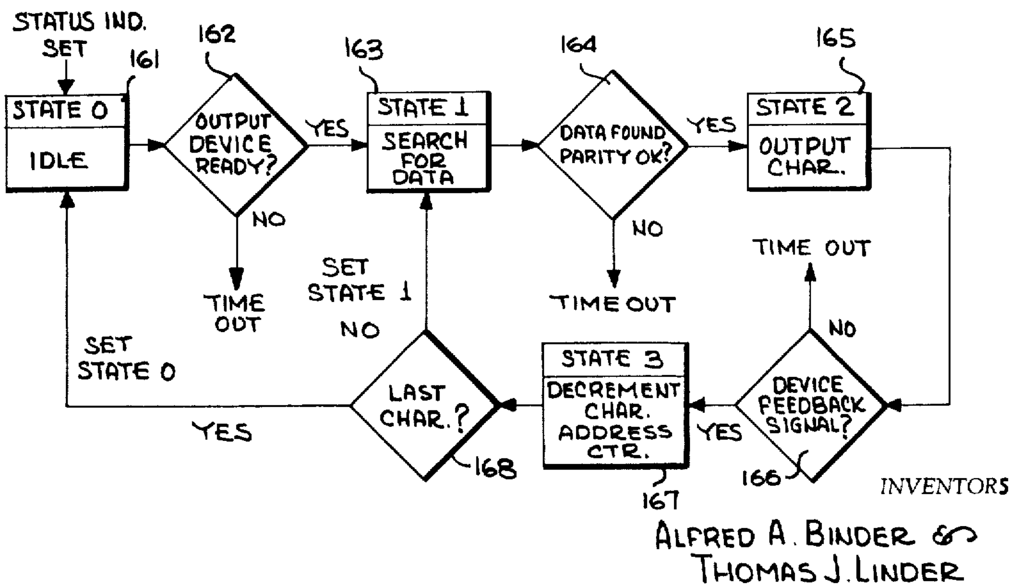
FIGURE 4 is a flow diagram to assist in an understanding of FIGURES 1–3.

To summarize the system operation, reference is made to the flow diagram of FIGURE 4, in conjunction with FIGURES 1–3. Each rectangle of the flow diagram represents a separate state of sequence counter 17 and what function is performed in that state. The diamonds indicate the decision made when the counter is in the state designated by the preceding rectangle, as indicated by arrow direction.

Initially counter 17 is set to state zero 161, in response to flip flop 28 being activated to its set condition. As counter 17 leaves state zero, determination 162 regarding the readiness of output device 11 is made by examining the state of PSK relay 58. If relay 58 is not activated to indicate device 11 being disabled, the −6 volt potential across contact 66 is fed through AND gate 151, opened by the set output of flip flop 28 and the voltage deriving from zero indicating AND gate 90. The pulse passing through gate 151 is coupled via OR gate 112 to activate alarm 113. Hence, the system operator is provided with an indication that output device 11 is not operating and counter 17 remains in state zero. When output device 11 is properly activated, PSK relay 59 is energized to open and close contacts 67 and 66, respectively, whereby AND gate 151 is closed so alarm 113 is not activated and AND gate 102 is opened. Opening gate 102 allows the zero indicating output of AND gate 90 to be fed through OR gate 100 to advance counter 17 into state one, indicated by rectangle 163, FIGURE 4.

In state one, AND gate 91 is activated to read the address indicated by counter 16 out of memory 13 into character register 15. The preceding operation occurs in response to the B clock pulse immediately following the A clock pulse that set counter 17 to state one. In response to the next A clock pulse while counter 17 is still in state one, the bits stored in register 15 are checked for parity by circuit 18, as indicated by diamond 164 in FIGURE 4. If circuit 18 indicates a parity error, gate 109 is enabled to pass the state one output of gate 91 to alarm 113 and counter 17 remains in state one. When there is a parity agreement, however, gate 101 is opened to pass the output of gate 91 through OR gate 100, whereby counter 17 is advanced to state two, indicated by rectangle 165.

In response to the B clock pulse immediately following activation of counter 17 to state two, a pulse is derived from AND gate 92. This pulse enables gate 21 to pass the six information containing bits stored in register 15. These bits are supplied in parallel to device 11 for activation of a punch, key, etc., in device 11 in accordance with the character being non-destructively read out of register 15. If device 11 does not record the character, as indicated in FIGURE 4 by diamond 166, no pulse is supplied to shaper 24 and it derives an output voltage on lead 114 that enables gate 115. With gate 115 enabled, the output of state two indicating AND gate 92 is fed to alarm 113 and counter 17 remains in state two.

When, however, device 11 records the character, generator 23 derives a pulse that is elongated by shaper 24 so the pulse deriving from the shaper occurs simultaneously with the next A clock pulse. In response to the "device feedback" signal generated by shaper 24 and the output of gate 92, gate 103 opens. The pulse thus deriving from gate 103 advances counter 17 to state three, indicated at 167 in FIGURE 4. In state three, an output is generated by AND gate 93 to decrement counter 16 to the next address read from memory 13. The contents of memory 13 are not now read from it into register 15, however, so the register still stores the data at the previous address. The contents of that address are analyzed by last character determining circuit 25 which generates complementary voltages on leads 124 and 125 indicating whether or not the predetermined last address code is stored in register 15. This operation is represented in FIGURE 4 by diamond 168.

For a binary one voltage on lead 125, indicative of the character being considered is not the last character ($\overline{LC}$), gate 123 is opened to pass the pulse deriving from gate 93. This pulse is coupled to lead 84 whereby counter 17 is reset to state one, rectangle 163. From state one, the sequence described supra is followed and repeated until the last character is detected.

Detection of the last character detection (LC) results in a binary one voltage being generated on lead 124 to open gate 122. With gate 122 open, the output of AND gate 93 is passed to the reset input of flip flop 28 as well as to leads 85 and 87. The pulses on leads 85 and 87 set counter 17 back to its initial zero state so that the counter is prepared to go through another cycle from the correct starting point. Counter 17 cannot now be advanced from state zero to state one until another message is loaded into buffer memory 13 because the reset output of flip flop 28 inhibits opening of gate 100 through the connection established by lead 129. Resetting flip flop 28 has the additional function of enabling gate 14 to be opened so new information can be loaded into memory 13.

When flip flop 28 is reset, the voltage across coil 56 drops to deactivate "type" relay 55, thereby causing contacts 54 and 75 to open. In response to contacts 54 and 75 being open, relays 63 and 59 are deenergized so they are able to sense the status of power supply 32 and switch 71 on device 11 when the next message is fed to memory 13.

If power to peripheral output device 11 is removed during the middle of a message because: switch 41 disengages "on" contact 50; a fuse is blown; or a power plug disconnected; PSK relay 59 is deactivated to open contact 66. The resulting −6 volt potential on lead 133 is passed through AND gate 134, enabled in response to either the state one, two or three output of gates 91–93. The state zero output deriving from gate 90 need not be considered since the counter is never activated to it while a message is being fed to device 11.

In response to the power failure indicating pulse passed through gate 134, counter 17 is reset to zero. In response to counter 17 being reset to zero, counter 16 is also reset to zero.

Resetting counter 17 in response to the signal deriving from gate 134 does not enable new information to be read into memory 13 because gate 14 remains closed. Hence, the message subsisting in memory 13 when device 11 became inoperative continues to be stored in the memory. The continued message storage in memory 13 results from status indicating flip flop 28 being maintained in its set state until the successful completion of a message block, as determined the last character code.

It is thus seen that the entire message stored in buffer 13 is read out when the trouble source in device 11 has been cured. At such time, a new label to be printed upon, for instance, will be correctly positioned in device 11 and a new start can be made thereon without loss of data.

To correct the trouble source, switch 71 is moved to its "stop" terminal whereby device 11 is energized with an auxiliary power supply, not shown, that is utilized strictly for testing as an aid in determining the error source. After power to terminal 50 is restored, switch 71 must be returned to its run position so relay 63 can be activated. Otherwise, the circuit for energizing relay 59 is not completed and counter 17 stays in its zero state.

While we have described and illustrated one specific embodiment of our invention, it will be clear that variations of the details of construction which are specifically illustrated and described may be resorted to without departing from the true spirit and scope of the invention as defined in the appended claims.

We claim:

1. In a data processor wherein data are transferred from a main processor through an addressed buffer memory to an outputting device, means for deriving an indication in response to a non-operating condition of said device, means responsive to said indication for resetting said memory back to a predetermined address, and means responsive to said indication for preventing data flow from the main processor to the buffer memory while said device is in the non-operating condition.

2. In a data processor wherein data are transferred from a main processor through an addressed buffer memory to an outputting device, gating means responsive to a signal deriving from said main processor for selectively coupling an information block from said main processor to said buffer memory, said information block including a multiplicity of characters, each of which is to be recorded sequentially by said device, said memory being addressed in accordance with the character read out sequence, means for sequentially reading characters from sequential addresses of said memory to said device only after said block has been entered into said memory, means for deriving an indication in response to a non-operating condition of said device, means responsive to said indication for resetting said memory back to the first character in said block, and means responsive to said indication for always closing said gate while said device is in the non-operating condition.

3. The data processor of claim 2 wherein each of said characters is always supposed to have an odd number of predetermined valued binary bits, means responsive to each character in said memory for detecting a character having an even number of said bits, and means responsive to said last named means for preventing the detected character from being coupled from said memory to said device and for freezing said memory at the address of said detected character.

4. In a data processor wherein data are transferred from a main processor through an addressed buffer memory to an outputting device, gating means responsive to a signal deriving from said main processor for selectively coupling an information block from said main processor to said buffer memory, said information block including a multiplicity of characters, each of which is to be recorded sequentially by said device, said memory being addressed in accordance with the character read out sequence, said device including means for deriving a pulse in response to each character being outputted thereby, means for sequentially reading a character from a different address in said memory to said device in response to each of said pulses, means for activating said last named means only after said block has been entered into said memory, means for deriving an indication in response to a non-operating condition of said device, means responsive to said indication for resetting said memory back to the first character in said block, and means responsive to said indication for always closing said gate while said device is in the non-operating condition.

5. The data processor of claim 4 including means for deriving another signal when said output device fails to output a character in response to a character being supplied thereto from said memory, means for freezing the address of said memory in response to said signal, and means for always closing said gate while the address of said memory is frozen.

6. In a data processor wherein data are transferred from a main processor through an addressed buffer memory to an outputting device, gating means responsive to a signal deriving from said main processor for selectively coupling an information block from said main processor to said memory, said information block including a multiplicity of characters, each of which is to be recorded sequentially by said device, the last character in said block having a predetermined code, said memory being addressed in accordance with the character read out sequence, means for sequentially reading characters from sequential addresses of said memory to said device only after said block has been entered into said memory, means for deriving an indication in response to a non-operating condition of said device, means responsive to said indication for resetting said memory back to the first character in said block, means responsive to said predetermined code for deriving a stop signal, and means for opening said gating means only in response to said stop signal.

7. In a data processor wherein data are transferred from a main processor through an addressed buffer memory to an outputting device, gating means responsive to a signal deriving from said main processor for selectively coupling an information block from said main processor to said buffer memory, said information block including a multiplicity of characters, each of which is to be recorded sequentially by said device, the last character in said block having a predetermined code, an address counter for controlling the data address read out of said memory, said device including means for deriving a pulse in response to each character being outputted thereby, means responsive to each of said pulses for advancing the state of said counter, means for deriving an indication in response to a non-operating condition of said device, means responsive to said indication and said predetermined code for setting said memory address back to the first character in said block, and means for opening said gating means only in response to said code.

8. The data processor of claim 7 including means for deriving a signal when said device fails to properly output a character supplied thereto from said memory, and means responsive to said signal for stopping said counter at the address for the character that was not outputted.

9. The data processor of claim 7 wherein each of said characters is always supposed to have an odd number of predetermined valued binary bits, means responsive to each character in said memory for detecting a character having an even number of said bits, and means responsive to said last named means for preventing the detected character from being coupled from said memory to said device and for freezing said counter at the address of said detected character.

10. The data processor of claim 7 wherein each of said characters is always supposed to have an odd number of predetermined valued binary bits, means responsive to each character in said memory for detecting a character having an even number of said bits, means responsive to said last named means for preventing the detected character from being coupled from said memory to said device and for freezing said counter at the address of said detected character, means for deriving a signal when said device fails to properly output a character supplied thereto from said memory, and means responsive to said signal for stopping said counter at the address for the not outputted character.

11. In a data processor wherein data are transferred from a main processor through an addressed memory to an output device, a four state sequencer having stages denominated zero, one, two and three, gating means for feeding a block of information from the main processor to said memory only when said sequencer is in stage zero after the immediately previous sequencer's stage was three, said information block including a multiplicity of characters, wherein each of said characters when accurate always has an odd number of predetermined valued binary bits, and the last character of said block has a predetermined code, means for deriving first and second indications in response to non-operating and operating conditions respectively of said device, means responsive to said second indication for advancing said sequencer from stage zero to stage one, means activated by said sequencer being in stage one for detecting the presence of an odd or even number of said bits in the addressed memory character and for deriving third and fourth indications respectively indicative of said detected odd and even numbers, means responsive to said fourth indication for advancing said sequencer from stage one to stage two, means responsive to said sequencer being in stage two for feeding the addressed character to said device, said device deriving a signal when said addressed character is outputted thereby, means responsive to said signal when the sequencer is in stage two for deriving a fifth indication, means for deriving a sixth indication when said sequencer is in state two and said signal is not derived, means responsive to said fifth indication for advancing said sequencer from stage two to stage three, means responsive to said sequencer being in stage three for detecting the occurrence of said code, means responsive to said detecting means for deriving seventh and eighth indications when the addressed character has and does not have said code, respectively, means responsive to said sequencer being in stage three for addressing said memory to the next character, means responsive to said seventh and eighth indications for advancing said sequencer from stage three to stages zero and one, respectively, means responsive to said first, third, and sixth indications for preventing the further advance of said sequencer, means responsive to a non-operating condition of said device for resetting said sequencer back to stage zero, and means for resetting the memory to the first address character in response to said sequencer being reset to stage zero.

No references cited.

ROBERT C. BAILEY, *Primary Examiner.*

R. ZACHE, *Assistant Examiner.*